United States Patent [19]

Craig

[11] Patent Number: 4,659,771

[45] Date of Patent: Apr. 21, 1987

[54] POLYACRYLATE DISPERSIONS

[75] Inventor: Daniel H. Craig, Hockessin, Del.

[73] Assignee: Hercules Incorporated, Wilmington, Del.

[21] Appl. No.: 880,932

[22] Filed: Jun. 23, 1986

Related U.S. Application Data

[63] Continuation-in-part of Ser. No. 768,283, Aug. 22, 1985, abandoned.

[51] Int. Cl.$^4$ .................. C08L 33/08; C08L 33/10; C08L 93/04
[52] U.S. Cl. .................................. 524/700; 524/704; 524/714; 524/733; 524/734; 524/735; 524/764
[58] Field of Search ............... 524/700, 704, 714, 726, 524/733, 734, 735, 764

[56] References Cited

U.S. PATENT DOCUMENTS

| | | | |
|---|---|---|---|
| 3,637,563 | 1/1972 | Christena | 523/305 |
| 3,876,596 | 4/1975 | Grubert et al. | 524/733 |
| 4,029,622 | 6/1977 | Keller et al. | 524/375 |
| 4,031,053 | 6/1977 | Bunkley et al. | 524/833 |
| 4,265,796 | 5/1981 | Mueller-Mall et al. | 524/510 |
| 4,540,739 | 9/1985 | Midgley | 524/818 |

FOREIGN PATENT DOCUMENTS 1278813  6/1972  United Kingdom .

Primary Examiner—John Kight
Assistant Examiner—Nathan M. Nutter
Attorney, Agent, or Firm—Joanne L. Horn

[57] ABSTRACT

Disclosed are aqueous polyacrylate dispersions having improved rheological and stability characteristics prepared by the emulsion polymerization of acrylic esters, methacrylic esters and mixtures thereof in the presence of at least one protective colloid, wherein the improvement comprises conducting the polymerization in the presence of, by weight of the total monomer content, from about 0.1 to 5% of at least one substantially completely water-soluble monomer having conjugated unsaturation. The resultant aqueous polyacrylate dispersions are useful in the manufacture of latex paints, binders for nonwoven materials, water-based inks, paper coatings and water-borne adhesives, such as pressure-sensitive adhesives.

20 Claims, No Drawings

POLYACRYLATE DISPERSIONS

This invention relates to aqueous polyacrylate dispersions having improved rheological and stability characteristics and processes for their preparation. The aqueous polyacrylate dispersions are useful in the manufacture of latex paints, binders for nonwoven materials, water-based inks, paper coatings and water-borne adhesives, such as pressure-sensitive adhesives.

It is known that the presence of protective colloids, such as hydroxyethylcellulose (HEC) and polyvinyl alcohol, in the emulsion polymerization of acrylic esters, methacrylic esters or mixtures thereof together with above about 50% vinyl acetate, by weight of the total monomer, provides latices having good mechanical stability and viscosity control. However, when the vinyl acetate comonomer is not used or is used in amounts less than 50%, a stable latex cannot be obtained if the protective colloid is present.

Further, it is known that the presence of protective colloids during the manufacture of polyacrylate dispersions or latices from reaction mixtures having a high acrylate or methacrylate content usually results either in coagulated dispersions or in extremely viscous dispersions which are unsuitable for use as paint binders or any other use.

Thus, in order to provide acrylic latices having the improved stability which results from the successful incorporation of protective colloids during the emulsion polymerization of acrylic or methacrylic monomers, a number of methods have been developed. For example, British Patent No. 1,278,813 discloses the use of emulsion stabilizers, such as allyl alcohols, allyl halides and low molecular weight aliphatic alcohols; whereas U.S. Pat. No. 4,265,796 teaches the use of molecular weight regulators, such as mercaptoacetic acid and cyclohexylamine, to permit the inclusion of protective colloids in the manufacture of polyacrylate dispersions.

Other processes provide for the gradual addition of the protective colloid during the polymerization reaction (see, e.g., U.S. Pat. No. 3,876,596). The resultant latices, however, have a high viscosity, coarse particle size and poor processing characteristics.

The use of high levels of surfactants, e.g., about 5% to about 10%, based on the monomer, in place of the protective colloid has also been used to obviate the problems associated with the emulsion polymerization of acrylic esters and methacrylic esters in the presence of a protective colloid. However, the properties of the resultant latex, such as its film-forming ability, tensile strength, film-blocking resistance and water and solvent resistance are adversely affected.

This invention provides a method for successfully incorporating the protective colloid in acrylic ester and methacrylic ester latices without agglomeration which does not require the presence of emulsion stabilizers, molecular weight regulators or high surfactant levels during their preparation. The polyacrylate latices of this invention are low viscosity, shear stable, essentially grit free and reproducible and have good flow behavior.

In accordance with this invention, it has been found that protective colloids are readily and successfully incorporated in polyacrylate dispersions by the emulsion polymerization of acrylic esters, methacrylic esters and mixtures thereof in the presence of at least one protective colloid, wherein the improvement comprises conducting the polymerization in the presence of, by weight of the total monomer content, from about 0.1 to 5% of at least one substantially completely water-soluble monomer having conjugated unsaturation, as hereinafter defined. The resultant latices are low viscosity, essentially grit free (0.2% or less, generally 0.1%), shear stable and water-insoluble and have a particle size from about 0.3 to 1.0 microns, usually from 0.6 to 1.0. Latex paints formulated with these latices exhibit good abrasion resistance.

Acrylic esters and methacrylic esters suitable for use in the practice of this invention include alkyl acrylates and methacrylates wherein the alkyl group contains less than 10 carbon atoms. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate. These monomers can be homopolymerized or copolymerized with each other.

In addition to being copolymerized with each other, the aforementioned acrylates and methacrylates can be copolymerized with one or more different monomers capable of addition type polymerization, including styrene, $C_{10-22}$ alkyl acrylates, $C_{10-22}$ alkyl methacrylates, acrylic or methacrylic acid, vinyl and vinylidene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted (including N-substituted) amides of all said acids.

Suitable $C_{10-22}$ alkyl esters of acrylic and methacrylic acid include decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl-lauryl methacrylate.

Suitable vinyl esters include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as, allyl acetate, allyl propionate and allyl lactate. Generally, these monomers are used in amounts ranging up to about 10% by weight of the total weight of monomers used. The allyl esters of saturated monocarboxylic acids are generally used in relatively small amounts together with larger amounts of one or more different vinyl monomers, particularly with aliphatic vinyl esters such as vinyl acetate.

Typical vinyl ethers include methylvinyl ether, ethylvinyl ether and n-butylvinyl ether and typical vinyl ketones include methylvinyl ketone, ethylvinyl ketone and iso-butylvinyl ketone. Suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Monoethylenically unsaturated monocarboxylic acids, such as acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as comonomers in the practice of this invention.

Acrylonitrile, alpha-chloro-acrylonitrile and methacrylonitrile are among the corresponding nitriles of such acids which can be used as comonomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Typical N-substituted amides include N-methylolacrylamide, N-methylolmethacrylamide, alkylated N-methylolacrylamides and N-methylolmethacrylamides, such as N-methoxymethylacrylamide and N-methoxymethylmethacrylamide.

Amino monomers which can be used in the practice of this invention include substituted and unsubstituted aminoalkyl acrylates, hydrochloride salts of amino monomers and methacrylates, such as beta-aminoethylacrylate, beta-aminoethylmethacrylate, dimethylaminomethylacrylate, beta-dimethylaminoethylacrylate, dimethylaminomethylmethacrylate. Typical hydroxy-containing monomers include beta-hydroxyethylacrylate, beta-hydroxypropylacrylate, gamma-hydroxypropylacrylate and beta-hydroxyethylmethacrylate.

Typically, the comonomer is present in an amount from about 0.5% to less than 50%, by weight of the total monomer content, preferably from about 0.5% to about 25%, most preferably from about 1% to about 10%.

The substantially completely water-soluble monomers having conjugated unsaturation, i.e., double or triple bonds, suitable for use in the practice of this invention include furoic acid, styrene sulfonic acid, the metal salts, amine salts, ammonium salts and quaternary salts of rosin and of acids having $C_4$ to $C_{36}$ carbon atoms, preferably $C_4$ to $C_{24}$ carbon atoms, and the water-soluble derivatives thereof. Suitable substantially completely water-soluble monomers having conjugated unsaturation include the water-soluble amine salts, amides, substituted amides, hydroxyalkyl esters and sulfoalkyl esters of sorbic acid, cinnamic acid, abietic acid, furoic acid, styrene sulfonic acid, linoleic acid, furylacrylic acid and muconic acid.

The term "substantially completely water-soluble" as used herein means a monomer having conjugated unsaturation which has a solubility of at least 0.4 grams per 100 ml of water at room temperature (about 20° C.), preferable 1.0 grams per 100 ml of water.

Suitable metals for forming the metal salts include sodium, potassium, lithium, magnesium, calcium and zinc.

Only substantially completely water-soluble monomers possessing conjugated unsaturation, as defined herein, are useful in the practice of this invention. Water-insoluble conjugated monomers, such as hexadiene, butadiene, isoprene, sorbic acid, cinnamic acid, abietic acid, vinyl benzoic acid, linoleic acid and muconic acid provide coagulated dispersions or highly viscous dispersions.

The water-soluble monomers having conjugated unsaturation are used at very low levels, generally for nonsurface-active conjugated monomers the amount is from about 0.1 to 5%, by weight of the total monomer content, preferably from about 0.1 to about 2%, and most preferably from about 0.5 to about 1%. If higher levels of the nonsurface-active conjugated unsaturated monomer is used, i.e. above about 2%, the conversion of the monomer to polymer takes longer.

When the substantially completely water-soluble conjugated unsaturated monomer is a surface-active monomer, such as a metal salt of rosin, higher levels may be used since such surface-active conjugated monomers can function as a surfactant thereby filling the role of both the conjugated monomer and the surfactant. Preferably 1% to about 5% of such surface-active conjugated unsaturated monomers are used, most preferably 1% to about 3%.

These conjugated monomers are readily copolymerizable with acrylic esters and methacrylic esters. The resultant polyacrylate dispersions impart significant improvement to the wet-abrasion resistance of latex paints formulated with them.

Typical protective colloids include hydroxyethyl cellulose, ethylhydroxyethyl cellulose, carboxymethyl cellulose, ethoxylated starch derivatives, partially and fully hydrolyzed polyvinyl alcohols, polyacrylic acid, sodium and other alkali metal polyacrylates, polyacrylamide, poly(methylvinyl ether-maleic anhydride), polyvinylpyrrolidone, water-soluble starch, glue, gelatin, watersoluble alginates, such as sodium or potassium alginate, casein, agar and natural and synthetic gums, such as gum arabic and gum tragacanth.

Although the amount of protective colloid used will vary depending on the desired viscosity, particle size and latex properties, generally from about 0.05 to about 5%, by weight of the total monomer content, is employed, preferably from about 0.2% to about 1%. The amount useful in a particular addition polymerization reaction to obtain the viscosity, particle size and latex properties desired is well within the knowledge of those skilled in the art.

Anionic, cationic, nonionic and amphoteric emulsifiers and mixtures thereof known in the art may be used in the practice of this invention; or completely omitted if higher levels of surface-active conjugated monomers are used.

Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters in amounts usually of from 0.1 to 5.0% by weight based on the monomers. Any known methods of emulsion polymerization may be used, including batch, semi-batch, continuous or redox techniques. Semi-batch monomer addition, other than the water-soluble conjugated monomer, with either batch or continuous addition of the initiator concomitant with the delayed addition of monomer, other than the water-soluble conjugated unsaturated monomer, is preferred. Preferably from about 1% to about 50% of the monomer or monomers, other than the water-soluble conjugated monomer, is added in the initial charge to the reactor, most preferably about 8% to about 35%. The continuous addition of any reaction ingredient or ingredients is generally done over a period of from about 2 to about 4 hours. The delayed addition of protective colloid or the water-soluble conjugated monomer along with either batch or delayed initiator addition may be used, although these variations are not necessary for the success of this invention. Indeed, the inclusion of the conjugated monomers in the initial reactor charge is sufficient for the success of this invention, regardless of the method of addition of the rest of the reaction components.

In general, the monomers are polymerized in aqueous emulsion at from about 45° C. to about 95° C. in the presence of a free radical polymerization initiator, particularly a water-soluble peroxide, e.g., hydrogen peroxide, persulfates such as potassium, sodium and ammonium persulfates or in some cases perborates. Other methods known in the art may also be used to polymerize acrylic monomers, such as redox catalysts.

The exact mechanism by which the substantially completely water-soluble conjugated unsaturated monomers provide low viscosity, stable latices in the presence of protective colloids is not known. However, it is theorized that the grafting reactions of acrylic and/or methacrylic monomers onto the protective colloid are reduced in the presence of the water-soluble conjugated monomers and that this reduction in grafting produces lower viscosity. This reduction in grafting also prevents agglomeration of the dispersion since the agglomerated particles most likely come about via the bridging of latex particles which is the result of grafting between the acrylic ester and/or methacrylic ester monomer and the protective colloid.

All parts and percentages used in this specification are by weight unless otherwise indicated.

The following examples are illustrative of this invention.

EXAMPLE 1

This example illustrates one embodiment of the aqueous polyacrylate dispersions of this invention and how to prepare same.

A reaction vessel equipped with a stirrer, reflux condenser, thermometer, one feed port and a water jacket is charged with 50.15 parts distilled water, 1 part octylphenol ethoxylate having 10 moles of ethylene oxide, 0.15 parts sodium dodecyl benzene sulfonate, 0.5 parts potassium sorbate, 0.2 parts hydroxyethyl cellulose having a Brookfield viscosity of 93 cps in a 5% aqueous solution at 25° C. and a hydroxyethyl molar substitution (M.S.) of 2.5 (M.S. is the average number of moles of a substituent group per anhydroglucose unit of the cellulose molecule), and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water, 2.0 parts of a 5% aqueous solution of potassium persulfate is added batchwise and the addition of 34 parts of the above monomer mixture is started and continued uniformly over 2.5 hours. After one-half of the total monomer feed has been added, 2.0 parts of a 5% aqueous solution of potassium persulfate is added batchwise. The reaction temperature is maintained at 85° C. for 2 hours after the addition of the monomer feed. The reaction mixture is then cooled by circulating cold water.

EXAMPLE 2

This example illustrates another embodiment of this invention.

The procedure and formulation of Example 1 are used except that hydroxyethyl cellulose having a Brookfield viscosity of 245 cps in a 2% aqueous solution at 25° C. is used instead of hydroxyethyl cellulose having a Brookfield viscosity of 93 cps in a 5% aqueous solution at 25° C.

EXAMPLE 3

This example illustrates another embodiment of this invention.

The procedure and formulation of Example 1 are used except that 0.5 parts of the hydroxyethyl cellulose is used instead of 0.2 parts.

EXAMPLE 4

This example illustrates another embodiment of this invention.

The procedure and formulation of Example 1 are used except that 0.5 parts of the hydroxyethyl cellulose is used instead of 0.2 parts, and except that 1.0 part potassium sorbate is used instead of 0.5 parts.

EXAMPLE 5

This example illustrates another embodiment of this invention.

The procedure and formulation of Example 1 are used except that 0.5 parts of the hydroxyethyl cellulose is used instead of 0.2 parts, and except that 1.0 part sodium cinnamate is used instead of 0.5 parts potassium sorbate.

EXAMPLE 6

This example illustrates another embodiment of this invention.

The procedure and formulation of Example 1 are used except that monomer mixture containing, by weight, 90 parts 2-ethylhexylacrylate, 9 parts methyl methacrylate and 1 part methacrylic acid is used instead of the monomer mixture containing, by weight, 42.7 parts butyl acrylate, 56.8 parts methyl methacrylate, and 0.5 parts methacrylic acid.

The product of this reaction is particularly useful in the manufacture of pressure-sensitive adhesives.

EXAMPLE 7

This example illustrates another embodiment of this invention.

The procedure and formulation of Example 1 are used except that the potassium salt of wood rosin (WG wood rosin from Hercules Incorporated) is used instead of potassium sorbate.

EXAMPLE 8

This example illustrates another embodiment of this invention.

A reaction vessel equipped with a stirrer, reflux condenser, thermometer, one feed port and a water jacket is charged with 50.6 parts distilled water, 0.15 parts sodium dodecyl benzene sulfonate, 1.15 parts potassium rosinate made from WG wood rosin from Hercules Incorporated, 0.1 part hydroxyethyl cellulose having a Brookfield viscosity of 93 cps in a 5% aqueous solution at 25° C. and hydroxyethyl M.S. of 2.5, and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water, 4.0 parts of a 5% aqueous solution of potassium persulfate is added batchwise and the addition of 34 parts of the above monomer mixture is started and continued uniformly over 2.5 hours. The reaction temperature is maintained at 85° C. for 2 hours after the addition of the monomer feed. The reaction mixture is then cooled by circulating cold water.

EXAMPLE 9

This example illustrates another embodiment of this invention.

The formulation and procedure of Example 8 are used except that 0.3 parts sodium dodecyl benzene sulfonate is used instead of 0.15 parts.

EXAMPLE 10

This example illustrates another embodiment of this invention.

The procedure and formulation of Example 1 are used except that 0.5 parts carboxymethyl cellulose having an carboxymethyl degree of substitution (D.S.) of 0.7 (D.S. is the average number of substituent groups per anhydroglucose unit of the cellulose molecule) and a Brookfield viscosity of 35 cps in a 2% aqueous solution at 25° C. is used instead of the 0.2 parts hydroxyethyl cellulose.

EXAMPLE 11

This example illustrates another embodiment of this invention.

A reaction vessel equipped with a stirrer, reflux condenser, thermometer, one feed port and a water jacket is charged with 50.15 parts distilled water, 1 part octylphenol ethoxylate having 10 moles of ethylene oxide, 0.15 parts sodium dodecyl benzene sulfonate, 0.6 parts potassium sorbate, 0.2 parts hydroxyethyl cellulose having a Brookfield viscosity of 93 cps in a 5% aqueous solution at 25° C. and a hydroxyethyl M.S. of 2.5, and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water. The addition of 4.0 parts of a 5% aqueous solution of potassium persulfate and the addition of 34 parts of the above monomer mixture are started and continued uniformly over 2.5 hours. The reaction temperature is maintained at 85° C. for 2 hours after the additions are complete. The reaction mixture is then cooled by circulating cold water.

EXAMPLE 12

This example illustrates another embodiment of this invention.

The procedure and formulation of Example 11 are used except that 15 parts of the monomer mixture is initially charged to the reaction vessel instead of 10 parts and except that 29 parts of the monomer mixture is added to the reaction vessel later instead of 34 parts.

EXAMPLE 13

This example illustrates another embodiment of this invention.

The procedure and formulation of Example 11 are used except that 4 parts of the monomer mixture is initially charged to the reaction vessel instead of 10 parts and except that 40 parts of the monomer mixture is added to the reaction vessel later instead of 34 parts.

EXAMPLE 14

This example illustrates another embodiment of this invention.

The procedure and formulation of Example 11 are used except that all 44 parts of the monomer mixture is initially charged to the reaction vessel instead of 10 parts, i.e. none of the monomer mixture is added to the reaction vessel later.

COMPARATIVE EXAMPLE 15

This example illustrates the preparation of aqueous polyacrylate dispersions in the presence of a water-insoluble conjugated unsaturated monomer.

The procedure and formulation of Example 1 are used except that 0.5 parts of the hydroxyethyl cellulose is used instead of 0.2 parts, and except that 1.0 part cis-2,-trans-4-hexadiene is used instead of 0.5 parts potassium sorbate.

COMPARATIVE EXAMPLE 16

This example illustrates the preparation of aqueous polyacrylate dispersions in the absence of a substantially completely water-soluble conjugated unsaturated monomer.

The procedure and formulation of Example 1 are used except that 0.5 parts carboxymethyl cellulose having a carboxymethyl D.S. of 0.7 and a Brookfield viscosity of 35 cps in a 2% aqueous solution at 25° C. is used instead of the 0.2 parts hydroxyethyl cellulose, and except that 0.5 parts potassium sorbate is omitted.

COMPARATIVE EXAMPLE 17

This example illustrates another preparation of aqueous polyacrylate dispersions in the absence of a substantially completely water-soluble conjugated unsaturated monomer.

The procedure and formulation of Example 1 are used except that 0.5 parts of the hydroxyethyl cellulose is used instead of 0.2 parts, and except that 0.5 parts potassium sorbate is omitted.

COMPARATIVE EXAMPLE 18

This example illustrates the preparation of aqueous polyacrylate dispersions in the absence of a protective colloid and a substantially completely water-soluble conjugated unsaturated monomer.

The procedure and formulation of Example 1 are used except that 0.5 parts of hydroxyethyl cellulose and 0.5 parts potassium sorbate are omitted.

COMPARATIVE EXAMPLE 19

This example illustrates the preparation of aqueous polyacrylate dispersions in the presence of a water-insoluble conjugated unsaturated monomer.

The procedure and formulation of Example 1 are used except that 0.5 parts of the hydroxyethyl cellulose is used instead of 0.2 parts, and except that sorbic acid is used instead of potassium sorbate.

COMPARATIVE EXAMPLE 20

This example illustrates the preparation of aqueous polyacrylate dispersions in the presence of a water-insoluble conjugated unsaturated monomer.

The procedure and formulation of Example 1 are used except that 0.5 parts of the hydroxyethyl cellulose is used instead of 0.2 parts, and except that cinnamic acid is used instead of potassium sorbate.

COMPARATIVE EXAMPLE 21

This example illustrates the preparation of aqueous polyacrylate dispersions in the presence of a water-insoluble conjugated unsaturated monomer.

The procedure and formulation of Example 1 are used except that 0.5 parts of the hydroxyethyl cellulose is used instead of 0.2 parts, and except that abietic acid is used instead of potassium sorbate.

COMPARATIVE EXAMPLE 22

This example illustrates the preparation of aqueous polyacrylate dispersions in the presence of a water-insoluble conjugated unsaturated monomer.

The procedure and formulation of Example 1 are used except that 0.5 parts of the hydroxyethyl cellulose is used instead of 0.2 parts, and except that conjugated linoleic acid is used instead of potassium sorbate.

The properties of the aqueous polyacrylate dispersions of Examples 1–14 and of Comparative Examples 15–22 are set forth in the following Table I.

TABLE I

| Example | pH | Solids, Wt. % | Viscosity, cps[1] Before | Viscosity, cps[1] After | Particle Size, microns[2] Before | Particle Size, microns[2] After | Shear Stability[3] |
|---|---|---|---|---|---|---|---|
| 1 | 5.8 | 46 | 265 | 52 | 1.3 | 0.44 | Yes |
| 2 | 5.9 | 46 | 388 | 66 | 2.8 | 0.73 | Yes |
| 3 | 6.2 | 48 | 5200 | 115 | 2.2 | 0.62 | Yes |
| 4 | 6.5 | 48 | 200 | 120 | 0.80 | 0.59 | Yes |
| 5 | 6.8 | 46 | 430 | — | 1.3 | — | Yes |
| 6 | 5.1 | 46 | 43 | — | 0.62 | — | Yes |
| 7 | 5.5 | 40 | 3500 | 15 | 3.2 | 0.25 | Yes |
| 8 | 6.5 | 46 | 62 | — | 0.72 | — | Yes |
| 9 | 6.5 | 48 | 2600 | — | 1.0 | 0.31 | Yes |
| 10 | 6.1 | 46 | 340 | — | 0.66 | — | Yes |
| 11 | 6.4 | 48 | 67 | 30 | 0.77 | 0.52 | Yes |
| 12 | 5.8 | 48 | 62 | 26 | 0.84 | 0.54 | Yes |
| 13 | 6.0 | 48 | 160 | 49 | 1.0 | 0.62 | Yes |
| 14 | 6.1 | 46 | 41 | 25 | 1.1 | 0.97 | Yes |
| 15[4] | — | — | 27,500 | — | 4.0 | — | Yes |
| 16 | 5.8 | 46 | dry, pasty consistency | — | 4.0 | — | Yes |
| 17 | 2.8 | 36 | coagulated- | — | 4.0 | — | Yes |
| 18 | 2.8 | 46 | 8 | — | 0.12 | — | No[5] |
| 19 | 2.8 | 34[6] | 2160 | 45 | 4.0 | 0.48 | Yes |
| 20 | 3.0 | 30[4] | 1950 | 70 | 4.0 | 0.85 | Yes |
| 21 | 2.8 | 30[4] | 3250 | — | 4.0 | — | Yes |
| 22 | 2.8 | 30[4] | 2700 | — | 4.0 | — | Yes |

[1]Brookfield LVT viscosity at 25° C. Wherever possible a viscosity reading is provided before and after shearing the sample in a Waring blender for 10 minutes at the highest speed.
[2]Wherever possible a Coulter Nanosizer particle size reading is provided before and after shearing the sample in a Waring blender for 10 minutes at the highest speed.
[3]Ten minutes in a Waring blender at highest speed.
[4]Only 30% of total monomer was added due to rapid and excessive build up in viscosity. The reaction gelled over time at 85° C.
[5]Failed after 10 seconds.
[6]Unable to complete the monomer addition due to high viscosity. Gellation occurred over time (approx. 60 min.).

EXAMPLE 23

The example illustrates the use of the polyacrylate latices of this invention in flat latex paint formulations and how to prepare them.

The latex paint is prepared by charging a Cowles disperser with the first 13 ingredients set forth below in Table II and mixing and grinding at high speed for 20 minutes. The remaining 3 ingredients of Table II are then added to the disperser and the mixture is ground at medium speed for 20 minutes.

TABLE II

| Ingredients | Parts by Weight |
|---|---|
| Distilled water | 444.5 |
| Potassium tripolyphosphate | 2.0 |
| Lecithin | 2.0 |
| Aqueous diisobutylene-maleic acid copolymer, Na salt (25% solids) | 5.0 |
| Defoamer 501 hydrophobic surface-modified silica** | 2.0 |
| Ethylene glycol | 20.0 |
| Diethylene glycol monobutyl ether acetate | 10.0 |
| Titanium dioxide, paint grade | 175.0 |
| Calcium carbonate | 150.0 |
| Iceberg clay | 125.0 |
| Silica, 3 microns average particle size; 99.5% $SiO_2$ | 25.0 |
| Nonylphenoxy polyethyleneoxyethanol (10) | 3.0 |
| Hydroxyethyl cellulose having a 2.5 M.S. | 5.5 |
| Bromobenzylacetate | 0.5 |
| Latex of Example 1* | 94.0 |
| Distilled-water | 56.0 |

*Based on 48% solids latex. The amount of wet latex and water added during the let-down stage will vary according to the weight percent latex solids. All latexes are formulated to 45 g dry latex solids.
**Available from Hercules Incorporated.

EXAMPLES 24–33 AND COMPARATIVE EXAMPLES 34–35

Examples 24–33 illustrate other embodiments of this invention.

The procedure and formulation of Example 19 are used except that the latexes of Examples 2, 3, 4, 5, 6, 7, 8, 9, 10, 11, 15, 16, 17 and 18, respectively, are used in Examples 24–37 instead of the latex of Example 1.

The properties of the latex formulations of Examples 23–37 are set forth in Table III below:

TABLE III

| Example | Abrasion Resistance[1], Cycles to Failure |
|---|---|
| 23 | 45–50 |
| 24 | 35 |
| 25 | 45–50 |
| 26 | 40–45 |
| 27 | 27–35 |
| 28 | — |
| 29 | 25 |
| 30 | 35–40 |
| 31 | 35 |
| 32 | 37–40 |
| 33 | 55–60 |
| 34 | — |
| 35 | — |
| 36 | 20–25 |
| 37 | 35–40 |

[1]Represents scrub cycles to failure of 78 PVC flat paint films after 4 days aging formulated with the respective latex according to ASTM D-2486-74a.

Thus this invention provides low viscosity, essentially grit free and shear stable acrylic latices having good flow behavior which can be formulated into latex paints having good abrasion resistance and into water-borne adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. A process for preparing an acrylic polymer latex by the aqueous emulsion polymerization of an acrylic ester, a methacrylic ester or mixtures thereof, and, optionally, a minor amount of a comonomer, in the presence of a protective colloid and a polymerization initiator, wherein the improvement comprises conducting the polymerization in the presence of from about 0.1% to 5%, by weight of the total monomer, of a substantially completely water-soluble conjugated unsaturated monomer.

2. The process of claim 1 wherein the substantially completely water-soluble conjugated unsaturated monomer is selected from the group consisting of furoic acid, styrene sulfonic acid, metal salts, amine salts, ammonium salts and quaternary salts of rosin and acids having $C_4$ to $C_{36}$ carbon atoms, and water-soluble derivatives thereof.

3. The process of claim 1 wherein the protective colloid is present in an amount of from 0.05% to about 5%.

4. The process of claim 3 wherein the protective colloid is selected from the group consisting of hydroxyethyl cellulose, ethylhydroxyethyl cellulose, carboxymethyl cellulose, ethoxylated starch derivatives, partially and fully hydrolyzed polyvinyl alcohols, polyacrylic acid, sodium and other alkali metal polyacrylates, polyacrylamide, poly(methylvinyl ether-maleic anhydride), polyvinylpyrrolidone, water-soluble starch, glue, gelatin, water-soluble alginates, casein, agar and natural and synthetic gums.

5. The process of claim 1 wherein the acrylic ester is selected from the group consisting of alkyl acrylates wherein the alkyl group contains less than 10 carbon atoms.

6. The process of claim 1 wherein the methacrylic ester is selected from the group consisting of alkyl methacrylates wherein the alkyl group contains less than 10 carbon atoms.

7. The process of claim 1 wherein the comonomer is present in an amount of from about 0.5% to less than 50%.

8. The process of claim 1 wherein (i) all of the substantially completely water-soluble conjugated unsaturated monomer, (ii) from about 1% to about 50% of the remaining monomer mixture and (iii) one-half of the polymerization initiator is added in an initial reaction charge, the rest of the remaining monomer mixture is then added continuously over a period from about 2 to about 4 hours, and the remaining half of the polymerization initiator is added and the reaction continued until polymerization is complete.

9. The process of claim 8 wherein from about 8% to about 35% of the remaining monomer mixture is added in the initial reaction charge.

10. The process of claim 1 wherein (i) all of the substantially completely water-soluble conjugated unsaturated monomer, (ii) from about 1% to about 50% of the remaining monomer mixture and (iii) the polymerization initiator is added in an initial reaction charge, the rest of the remaining monomer mixture is then added continuously over a period from about 2 to about 4 hours and the reaction continued until polymerization is complete.

11. The process of claim 10 wherein from about 8% to about 35% of the remaining monomer mixture is added in the initial reaction charge.

12. The process of claim 1 wherein (i) all of the substantially completely water-soluble conjugated unsaturated monomer and (ii) from about 1% to about 50% of the remaining monomer mixture is used in an initial reaction charge, the polymerization initiator and the rest of the remaining monomer mixture are then added continuously over a period from about 2 to about 4 hours and the reaction continued until polymerization is complete.

13. The process of claim 12 wherein from about 8% to about 35% of the remaining monomer mixture is added to the initial reaction charge.

14. The process of claim 8 wherein the substantially completely water-soluble conjugated unsaturated monomer is selected from the group consisting of furoic acid, styrene sulfonic acid, metal salts, amine salts, ammonium salts and quaternary salts of rosin and acids having $C_4$ to $C_{36}$ carbon atoms, and water-soluble derivatives thereof.

15. The process of claim 10 wherein the water-soluble conjugated unsaturated monomer is selected from the group consisting of furoic acid, styrene sulfonic acid, metal salts, amine salts, ammonium salts and quaternary salts of rosin and acids having $C_4$ to $C_{36}$ carbon atoms, and water-soluble derivatives thereof.

16. The process of claim 12 wherein the water-soluble conjugated unsaturated monomer is selected from the group consisting of furoic acid, styrene sulfonic acid, metal salts, amine salts, ammonium salts and quaternary salts of rosin and acids having $C_4$ to $C_{36}$ carbon atoms, and water-soluble derivatives thereof.

17. The product produced by the process of claim 1.
18. The product produced by the process of claim 8.
19. The product produced by the process of claim 10.
20. The product produced by the process of claim 12.

* * * * *